US012484960B2

(12) United States Patent
Zhou et al.

(10) Patent No.: US 12,484,960 B2
(45) Date of Patent: Dec. 2, 2025

(54) RADIOFREQUENCY ABLATION CATHETER AND RADIOFREQUENCY ABLATION SYSTEM

(71) Applicant: HANGZHOU BRONCUS MEDICAL CO., LTD, Zhejiang (CN)

(72) Inventors: Huazhen Zhou, Hangzhou (CN); Hong Xu, Hangzhou (CN); Liming Wang, Hangzhou (CN)

(73) Assignee: Hangzhou Broncus Medical Co., Ltd., Hangzhou (CN)

( * ) Notice: Subject to any disclaimer, the term of this patent is extended or adjusted under 35 U.S.C. 154(b) by 536 days.

(21) Appl. No.: 17/903,732

(22) Filed: Sep. 6, 2022

(65) Prior Publication Data

US 2022/0409272 A1    Dec. 29, 2022

Related U.S. Application Data

(63) Continuation of application No. PCT/CN2021/076118, filed on Feb. 8, 2021.

(30) Foreign Application Priority Data

Dec. 31, 2020   (CN) .......................... 202011637770.9
Dec. 31, 2020   (CN) .......................... 202011637865.0

(51) Int. Cl.
*A61B 18/14*     (2006.01)
*A61B 18/00*     (2006.01)

(52) U.S. Cl.
CPC .......... *A61B 18/1492* (2013.01); *A61B 18/14* (2013.01); *A61B 2018/00577* (2013.01);
(Continued)

(58) Field of Classification Search
CPC .. A61B 2018/00738; A61B 2018/1475; A61B 2018/0016; A61B 2018/00577;
(Continued)

(56) References Cited

U.S. PATENT DOCUMENTS 5,242,441 A * 9/1993 Avitall ............... A61B 18/1492
                                                        606/41
5,471,982 A * 12/1995 Edwards .............. A61B 5/6858
                                                        600/374
(Continued)

FOREIGN PATENT DOCUMENTS

CN    206167034 U    5/2017
CN    109833091 A    6/2019
(Continued)

OTHER PUBLICATIONS

International Search Report dated Sep. 27, 2021 for corresponding PCT Application No. PCT/CN2021/076118.

*Primary Examiner* — Joseph A Stoklosa
*Assistant Examiner* — Marina Delaney Templeton

(57) ABSTRACT

A radio-frequency ablation catheter comprises a handle having a proximal end and a distal end, an outer tube assembly having a proximal end and a distal end, and an inner tube assembly having a proximal end and a distal end; the proximal end of the outer tube assembly is connected to the distal end of the handle; the proximal end of the inner tube assembly is connected to the distal end of the handle; the inner tube assembly can be driven by the handle to rotate relative to the outer tube assembly; the inner tube assembly comprises a branch electrode assembly, and the branch electrode assembly comprises a plurality of branch electrodes distributed at intervals in the circumferential direction. The branch electrode assembly of the radio-frequency ablation catheter and the radio-frequency ablation system can rotate relative to the outer tube assembly to avoid blood vessels.

16 Claims, 10 Drawing Sheets

(52) U.S. Cl.
CPC ............... *A61B 2018/00946* (2013.01); *A61B 2018/00952* (2013.01); *A61B 2018/1405* (2013.01); *A61B 2018/1467* (2013.01); *A61B 2018/1475* (2013.01)

(58) Field of Classification Search
CPC .... A61B 2018/1405; A61B 2018/1467; A61B 2018/00946; A61B 2018/00952; A61B 2018/00196; A61B 2018/00202; A61B 2018/00267; A61B 2018/00184; A61B 18/1492; A61B 18/14; A61B 18/1482; A61B 2017/292; A61B 2017/2929
See application file for complete search history.

(56) References Cited

U.S. PATENT DOCUMENTS

| | | | | |
|---|---|---|---|---|
| 2006/0079883 | A1* | 4/2006 | Elmouelhi | A61B 18/1492 606/41 |
| 2006/0173450 | A1* | 8/2006 | Shibata | A61B 18/1492 606/45 |
| 2011/0202053 | A1* | 8/2011 | Moss | A61B 18/1477 606/41 |
| 2011/0319709 | A1* | 12/2011 | Suzuki | A61B 18/1477 600/104 |
| 2012/0046661 | A1 | 2/2012 | Ishii | |
| 2013/0158536 | A1* | 6/2013 | Bloom | A61B 18/1492 606/41 |
| 2014/0114304 | A1* | 4/2014 | Wang | A61B 18/1492 606/41 |
| 2020/0360666 | A1* | 11/2020 | Killeen | A61M 25/0147 |

FOREIGN PATENT DOCUMENTS

| | | |
|---|---|---|
| CN | 110179538 A | 8/2019 |
| CN | 110960314 A | 4/2020 |
| CN | 110974406 A | 4/2020 |
| CN | 212165886 U | 12/2020 |

* cited by examiner

RADIOFREQUENCY ABLATION CATHETER AND RADIOFREQUENCY ABLATION SYSTEM

TECHNICAL FIELD

The embodiments of the present invention relate to the field of medical instruments, and in particular to a radiofrequency ablation catheter and a radiofrequency ablation system.

BACKGROUND

The principle of radiofrequency ablation is to apply alternating high-frequency currents with a frequency of less than 30 MHz (usually 460-480 kHz) to cause ions in tumor tissue to oscillate at high speeds, rub each other, and convert radiofrequency energy into heat energy, causing tumor cells to undergo coagulation necrosis. In radiofrequency ablation therapy, the instrument used is a radiofrequency ablation catheter, which is connected with a radiofrequency generator. Under the guidance of B-scan ultrasonography or CT, the central electrode at the distal end of the radiofrequency ablation catheter is percutaneously punctured, and the target tumor is punctured through the puncture point, and the radiofrequency energy is transmitted to the cells and tissues around the puncture site, so that the tumor cells in contact with the central electrode undergo coagulation, degeneration, and necrosis.

A radiofrequency ablation catheter is known. In addition to the central electrode, the distal end of the radiofrequency ablation catheter is provided with a peripheral electrode assembly surrounding the central electrode. The peripheral electrode assembly includes a plurality of peripheral electrodes arranged in a circumferential direction, and the distal ends of the plurality of electrodes can be expanded outwardly to surround the central electrode in a claw shape. Through the peripheral electrode assembly, the conditions around the central electrode, such as temperature and/or impedance, can be obtained, and then the progress of ablation can be judged.

However, the inventor found that the existing peripheral electrode assembly is easy to puncture the blood vessel when entering the lesion site, resulting failure of the operation or bringing treatment risks or complications to the patient. In addition, some of the peripheral electrodes of the existing peripheral electrode assembly often cannot reach the ideal position when entering the lesion site, and the reliability of the ablation result is not good.

SUMMARY

The embodiments of the present invention aim to provide a radiofrequency ablation catheter and a radiofrequency ablation system to solve at least one of the above-mentioned technical problems.

In one aspect, the embodiments of the present invention provide a radiofrequency ablation catheter, including: a handle which has a proximal end and a distal end, an outer catheter assembly which has a proximal end and a distal end, and an inner catheter assembly which has a proximal end and a distal end; wherein the inner catheter assembly comprises a peripheral electrode assembly, the peripheral electrode assembly has a proximal end and a distal end, the distal end of the peripheral electrode assembly can protrude from the distal end of the outer catheter assembly, and the peripheral electrode assembly comprises a plurality of peripheral electrodes circumferentially spaced from each other; wherein the proximal end of the outer catheter assembly is connected with the distal end of the handle; the proximal end of the inner catheter assembly is connected with the distal end of the handle; the inner catheter assembly is rotatable relative to the outer catheter assembly by driving the handle. The inner catheter assembly including the peripheral electrode assembly is configured to be driven by the handle to rotate relative to the outer catheter assembly, so that when the peripheral electrode assembly protrudes from the distal end of the outer catheter assembly, blood vessels can pass through the gap between the adjacent peripheral electrodes of the peripheral electrode assembly, thereby avoiding puncturing the blood vessels, reducing the risk of operation failure or bringing hidden treatment hazards or complications to the patient, and solving the problem that the peripheral electrode assembly in the prior art is easy to pierce the blood vessels when it enters the lesion site, causing the operation to fail or bringing the hidden treatment hazards or complications to the patient.

In another aspect, the embodiments of the present invention also provide a radiofrequency ablation catheter, which includes a handle, the handle comprises a housing and a slidable assembly slidably connected with the housing, the slidable assembly comprises a plurality of slidable elements that are respectively and independently slidable in an axial direction relative to the housing, and a catheter assembly connected with the handle, the catheter assembly comprises a peripheral electrode assembly, the peripheral electrode assembly comprises a plurality of peripheral electrodes that are circumferentially spaced from each other; wherein at least some of the plurality of peripheral electrodes are configured to be driven by the respective slidable elements to slide in the axial direction; and wherein the catheter assembly comprises an outer catheter assembly connected with the handle and an inner catheter assembly connected with the handle, the inner catheter assembly is rotatable relative to the outer catheter assembly by driving the handle, the inner catheter assembly comprises a peripheral electrode assembly, and the peripheral electrode assembly comprises a plurality of peripheral electrodes circumferentially spaced from each other. By separately operating the slidable element that can independently slide in the axial direction relative to the housing, the peripheral electrode of the peripheral electrode assembly can be independently operated, so that the peripheral electrodes can be moved to the desired lesion in the axial direction as required, thereby improving the reliability of the ablation monitoring results, solving the problem that the peripheral electrode assembly in the prior art cannot reach the desired position when entering the lesion site with a poor reliability of the ablation monitoring results.

In a further aspect, the embodiments of the present invention also provide a radiofrequency ablation system, including the aforementioned radiofrequency ablation catheter. Since the radiofrequency ablation system includes the aforementioned radiofrequency ablation catheter, the aforementioned effects can also be achieved, which would not be repeated here.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description refer to some embodiments of the present invention. For those skilled persons in the art, other drawings can be obtained based on these drawings without creative labor.

Figure 1:
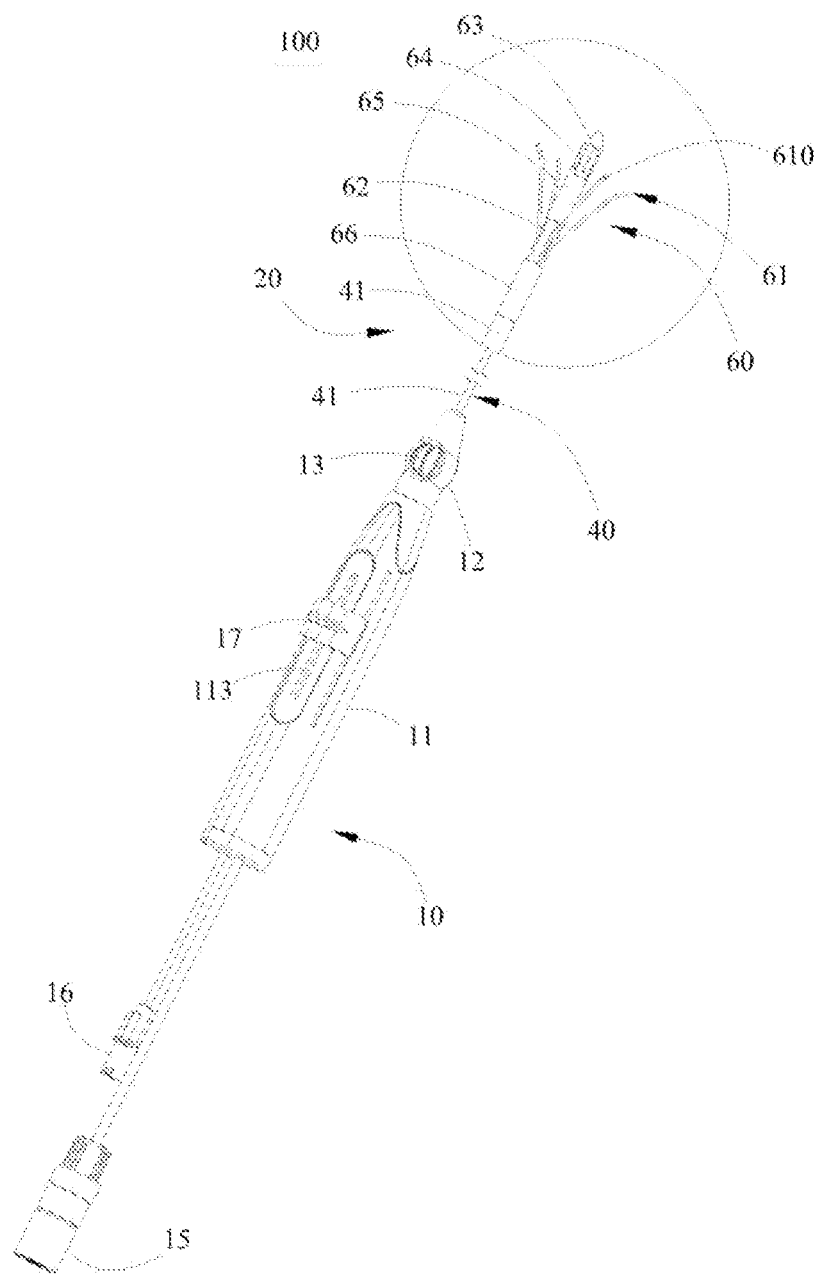
FIG. 1 is a schematic view of a radiofrequency ablation catheter according to a first embodiment of the present invention.

REFERENCES LIST 100, radiofrequency ablation catheter; 10, handle; 11, housing; 110, inner connector; 111, accommodating space; 112, post; 113, elongated hole; 12, end cap; 120, outer connector; 121, connecting piece; 122, space; 123, tapered portion; 124, opening; 13, rotatable ball; 130, noncircular hole; 14, push-pull rod; 15, electrode connector; 16, saline pipe connector; 17, slide button; 170, receiving groove; 18, fixing block; 20, catheter assembly; 40, outer catheter assembly; 400, second protrusion; 41, outer sheath; 42, connecting tube; 60, inner catheter assembly; 61, peripheral electrode assembly 61; 610, peripheral electrode; 611, probe; 612, sensor wire of peripheral electrode; 613, conducting wire of peripheral electrode; 62, support element; 620, through hole; 621, threaded post; 622, first groove; 63, central electrode; 630, connecting groove; 631, liquid inlet post; 64, infiltration cover; 640, infiltration hole; 65, first connecting sleeve; 66, rotatable element; 660, first protrusion; 67, spring tube; 68, second connecting sleeve;

200, radiofrequency ablation catheter; 210, handle; 220, outer connector; 223, tapered portion; 114, annular groove; 224, sliding ring;

300, radiofrequency ablation catheter; 311, housing; 313, elongated hole; 330, slidable element; 331, slidable rod; 332, first receiving hole; 317, slide button; 340, support seat; 341, second groove; 342, accommodating space; 361, support rod; 362, second receiving hole;

400, radiofrequency ablation system; 410, radiofrequency generator; 420, radiofrequency ablation catheter.

DESCRIPTION OF THE EMBODIMENTS

In order to make the objectives, technical solutions, and advantages of the embodiments of the present invention clearer, the technical solutions in the embodiments of the present invention will be described clearly and completely in conjunction with the accompanying drawings in the embodiments of the present invention. Obviously, the described embodiments are some of the embodiments of the present invention, but not all of the embodiments. Based on the embodiments of the present invention, all other embodiments obtained by those skilled persons in the art without creative work shall fall within the protection scope of the present invention.

In the description of the present invention, it should be understood that the terms referring to orientation or positional relationship indicated by, such as "center", "longitudinal", "transverse", "upper", "lower", "front", "rear", "left", "right", ", "vertical", "horizontal", "top", "bottom", "inner", "outer", "axial", "radial", "circumferential", etc. are based on the drawings, which are only for the convenience of describing the present invention and simplifying the description, rather than indicating or implying that the device or element referred to must have specific orientations, be constructed and operated in specific orientations, and therefore cannot be understood as limitations on the present invention.

In the description of the present invention, "axial" refers to the direction parallel to the overall length of the radiofrequency ablation catheter; "radial" refers to the direction perpendicular or substantially perpendicular to the axial direction; "circumferential" refers to the direction surrounding the axial direction.

"Inside"/"outside" are relative concepts, which means that one feature or an element where the feature is located is positioned at least partially radially inward/outward of another feature or another element where the another feature is located.

"Proximal end" and "distal end" are relative concepts. "Proximal end" refers to the end close to the user in the axial direction, which can refer to the side of a certain element, component or device close to the user, or a portion of a certain element, component or device close to the user. "Distal end" refers to the end far away from the user in the axial direction, which can refer to the distal side of a certain element, component or device away from the user, or a portion of a certain element, component or device away from the user.

In the present invention, unless otherwise clearly specified and limited, the terms "installed", "connected", "connecting", "fixed" and other terms should be understood in a broad sense, which, for example, can refer to a fixed connection or a detachable connection or one piece, or can refer to a mechanical connection or an electrical connection or a communication connection, or can refer to a direct connection or an indirect connection through a further element or an internal connection between two components or an interaction relationship therebetween, unless otherwise clearly defined. For those skilled persons in the art, the specific meanings of the above-mentioned terms in the present invention can be understood according to specific situations.

The technical solutions of the present invention will be described in detail below with specific embodiments. The same or similar concepts or processes in the following specific embodiments may not be repeated in some embodiments.

A radiofrequency ablation catheter previously developed by the inventor includes a handle and a catheter assembly connected with the handle. A distal end of the catheter assembly is provided with a central electrode and a peripheral electrode assembly surrounding the central electrode. The central electrode can be percutaneously punctured and transmit radiofrequency to the cell tissue around the puncture site, so that the tumor cells contacted by the central electrode undergo coagulation, degeneration, and necrosis. The peripheral electrode assembly is slidable in the axial direction and includes a plurality of peripheral electrodes spaced from each other in the circumferential direction. Through the peripheral electrode assembly, the conditions around the central electrode, such as temperature and/or impedance, can be obtained, and then the ablation progress can be monitored and determined.

On this basis, the inventor of the present application further discovered in research that the peripheral electrode assembly of this radiofrequency ablation catheter is likely to puncture/pierce the blood vessel when it enters the lesion site, resulting failure of the operation or bringing treatment risks or complications to the patient. To solve this problem, the inventor tried to rotate the handle of the radiofrequency ablation catheter to rotate the catheter assembly and thus the peripheral electrode assembly so that blood vessels can pass through the gaps between the peripheral electrodes of the electrode assemblies, thereby avoiding puncturing the blood vessels. However, because the catheter assembly of the radiofrequency ablation catheter is long and thin, it is difficult to rotate the peripheral electrode assembly located at the distal end of the catheter assembly by directly rotating the handle.

In addition, the inventor of the present application also found that because the peripheral electrode assembly of the radiofrequency ablation catheter slides integrally in the axial direction, some of the peripheral electrodes cannot be inserted into the desired area for detecting the lesion, and the positioning effect is poor, resulting a poor reliability for monitoring the ablation results.

The embodiments of the present invention provide a radiofrequency ablation catheter, including: a handle which has a proximal end and a distal end, an outer catheter assembly which has a proximal end and a distal end, and an inner catheter assembly which has a proximal end and a distal end; wherein the inner catheter assembly comprises a peripheral electrode assembly, the peripheral electrode assembly has a proximal end and a distal end, the distal end of the peripheral electrode assembly can protrude from the distal end of the outer catheter assembly, and the peripheral electrode assembly comprises a plurality of peripheral electrodes circumferentially spaced from each other; wherein the proximal end of the outer catheter assembly is connected with the distal end of the handle; the proximal end of the inner catheter assembly is connected with the distal end of the handle; the inner catheter assembly is rotatable relative to the outer catheter assembly by driving the handle. The inner catheter assembly including the peripheral electrode assembly is configured to be driven by the handle to rotate relative to the outer catheter assembly, so that when the peripheral electrode assembly protrudes from the distal end of the outer catheter assembly, blood vessels can pass through the gap between the adjacent peripheral electrodes of the peripheral electrode assembly, thereby avoiding puncturing the blood vessels, reducing the risk of operation failure or bringing hidden treatment hazards or complications to the patient, and solving the problem that the peripheral electrode assembly in the prior art is easy to pierce the blood vessels when it enters the lesion site, causing the operation to fail or bringing the hidden treatment hazards or complications to the patient.

In some embodiments, the inner catheter assembly further comprises a support element for supporting the peripheral electrode assembly, wherein the plurality of peripheral electrodes of the peripheral electrode assembly are spaced from each other in a circumferential direction of the support element, and the support element is rotatably connected with the outer catheter assembly. The support element rotatably connected with the outer catheter assembly supports the peripheral electrode assembly, which helps to rotate the peripheral electrode assembly stably.

In some embodiments, the support element has a proximal end and a distal end, and a proximal side of the support is opposite to a distal side of the outer catheter assembly; the inner catheter assembly further comprises a rotatable element for connecting the outer catheter assembly and the support element; the rotatable element has a proximal end and a distal end, wherein the distal end of the rotatable element is fixedly connected with the support element, and the proximal end of the rotatable element is rotatably connected with the outer catheter assembly. The rotatable element rotatably connected with the outer catheter assembly ensures that the peripheral electrode assembly can rotate relative to the outer catheter assembly. At the same time, the distal end of the outer catheter assembly can also limit the proximal end of the support element to a certain extent to prevent the support element from moving toward the proximal end in the axial direction when rotating together with the peripheral electrode assembly. In other embodiments, other structures can also be used. For example, the support element and the rotatable element may also be formed as a single piece.

In some embodiments, an outer wall of the support element has a plurality of grooves circumferentially spaced from each other, and a length direction of the groove corresponds to a length direction of the support element; the rotatable element covers a section of the plurality of grooves along the length direction thereof, and the peripheral electrodes are slidably received in respective grooves, and can be received in the rotatable element or slide out from the rotatable element. The groove helps the peripheral electrodes of the peripheral electrode assembly to move stably in the axial direction relative to the support element. Furthermore, the rotatable element covers a section of the plurality of grooves along the length direction thereof, in other words, the other section of the plurality of grooves along the length direction thereof is visible. Therefore, the rotation direction of the peripheral electrode assembly can be judged according to the visible section of the grooves, so that the blood vessel can pass through the gap between adjacent grooves, so that the peripheral electrodes of the peripheral electrode assembly in the grooves avoid blood vessels too. In other embodiments, the rotation direction of the peripheral electrode assembly can also be determined in other ways.

In some embodiments, the rotatable element is tubular, an inner wall of the rotatable element is provided with a first protrusion, and the distal end of the outer catheter assembly is provided with a second protrusion, and the first protrusion is rotatably engaged with the second protrusion. Through the engagement of the first protrusion and the second protrusion, not only the rotatable element can rotate relative to the outer catheter assembly, but the rotatable element can also be prevented from moving towards the distal end along the axial direction when rotating together with the peripheral electrode assembly.

In some embodiments, the outer catheter assembly comprises an outer sheath having a proximal end and a distal end, and a connecting tube fixedly connected with the distal end of the outer sheath, and wherein the proximal end of the outer sheath is connected with the distal end of the handle, the connecting tube has a proximal end and a distal end, and the second protrusion is provided on a distal side of the connecting tube. The handle is connected with the outer sheath, and the connecting tube is connected with the rotatable element, which facilitates the assembly of the radiofrequency ablation catheter. In other embodiments, the outer catheter assembly can also use other structures. For example, the outer catheter assembly can be formed in one piece.

In some embodiments, the proximal end of the connecting tube is received in the distal end of the outer sheath, and a distal side of the outer sheath abuts against a proximal side of the rotatable member. The outer sheath abuts against the rotatable element, so that the rotatable element can be effectively prevented from moving toward the proximal end in the axial direction when rotating together with the peripheral electrode assembly.

In some embodiments, the handle comprises a housing having a proximal end and a distal end, and an end cap rotatably connected with the distal end of the housing, and wherein the proximal end of the outer catheter assembly is connected with the end cap, and the inner catheter assembly is rotatable relative to the outer catheter assembly by a rotation of the housing relative to the end cap. The inner catheter assembly is driven to rotate relative to the outer catheter assembly by rotating the housing, and the operation is stable and convenient.

In some embodiments, the handle further comprises a slidable assembly slidably connected with the housing, and the slidable assembly is connected with the peripheral electrode assembly for driving the peripheral electrode assembly to move in an axial direction, and the peripheral electrode assembly is rotatable relative to the outer catheter assembly by the rotation of the housing relative to the end cap through the slidable assembly. The slidable assembly can not only transmit the torque of the housing to the peripheral electrode assembly to allow the rotation of the peripheral electrode assembly relative to the outer catheter assembly, but can also drive the peripheral electrode assembly to shift in the axial direction to adjust the axial position of the peripheral electrode assembly.

In some embodiments, the slidable assembly comprises a plurality of slidable elements slidably connected with the housing, and each of the slidable elements is at least partially arranged inside the housing, and a proximal end of each peripheral electrode extends into the housing and is fixedly connected with a respective slidable element. By separately controlling each slidable element, each peripheral electrode of the peripheral electrode assembly can be separately controlled, so that each peripheral electrode can be moved to the desired lesion site as required to improve the positioning effect of the peripheral electrode and improve the reliability of ablation monitoring results.

In some embodiments, the slidable assembly comprises a push-pull rod at least partially arranged in the housing and slidably connected with the housing, and the inner catheter assembly further comprises a spring tube received in the outer catheter assembly, the spring tube has a proximal end and a distal end, the proximal end of the spring tube is fixedly connected with the push-pull rod, and the distal end of the spring tube is fixedly connected with the peripheral electrode. By moving the push-pull rod, the peripheral electrode assembly can be moved in the axial direction, and the operation is simple and convenient. Furthermore, the spring tube can improve the operation feel.

In some embodiments, the slidable assembly further comprises a slide button slidably connected with the housing, with a portion of the slide button protruding from an outer surface of the housing, and the other portion of the slide button received in the housing and fixedly connected with the push-pull rod. By operating the slide button, the peripheral electrode assembly can be moved, which is convenient for operation.

In some embodiments, the handle comprises a housing having a proximal end and a distal end, an end cap connected with the distal end of the housing, a rotatable ball received in the end cap and a push-pull rod anti-rotationally connected with the rotatable ball, the proximal end of the outer catheter assembly is connected with the end cap, the push-pull rod is connected with the inner catheter assembly, and the inner catheter assembly is rotatable relative to the outer catheter assembly by a rotation of the rotatable ball relative to the end cap through the push-pull rod. By rotating the rotatable ball, the peripheral electrode assembly can be rotated, and the operation is convenient and accurate.

In some embodiments, the handle further comprises a slide button slidably connected with the housing, and a fixing block rotatably connected with the slide button, and wherein the push-pull rod is fixedly connected with the fixing block and is axially slidable relative to the rotatable ball, and the push-pull rod is axially slidable by an axial movement of the slide button relative to the housing through the fixing block. By operating the slide button, the peripheral electrode assembly can be moved, which is convenient for operation.

In some embodiments, the rotatable ball is provided with a noncircular hole, and the push-pull rod passes through the rotatable ball through the noncircular hole and is engaged with walls of the noncircular holes. The simple noncircular hole not only ensures that the push-pull rod can rotate with the rotation of the rotatable ball, but also ensures that the push-pull rod can move in the axial direction relative to the rotatable ball.

The embodiments of the present invention also provide a radiofrequency ablation catheter, which includes a handle, the handle comprises a housing and a slidable assembly slidably connected with the housing, the slidable assembly comprises a plurality of slidable elements that are respectively and independently slidable in an axial direction relative to the housing, and a catheter assembly connected with the handle, the catheter assembly comprises a peripheral electrode assembly, the peripheral electrode assembly comprises a plurality of peripheral electrodes that are circumferentially spaced from each other; wherein at least some of the plurality of peripheral electrodes are configured to be driven by the respective slidable elements to slide in the axial direction. By separately operating the slidable element that can independently slide in the axial direction relative to the housing, the peripheral electrode of the peripheral electrode assembly can be independently operated, so that the peripheral electrodes can be moved to the desired lesion in the axial direction as required, thereby improving the reliability of the ablation monitoring results, solving the problem that the peripheral electrode assembly in the prior art cannot reach the desired position when entering the lesion site with a poor reliability of the ablation monitoring results.

In some embodiments, the slidable element comprises a slidable rod slidably arranged in the housing and a slide button fixedly connected with the slidable rod and protruding from an outer surface of the housing, and the peripheral electrode is fixedly connected with the slidable rod, and the slide button is slidably connected with the housing. The slide button is operated to slide in the axial direction relative to the housing, thereby driving the peripheral electrode fixedly connected with the slidable rod to slide in the axial direction, and the operation is convenient.

In some embodiments, the housing has a plurality of elongated holes circumferentially spaced from each other, and the elongated hole radially passes through the housing, and a length direction of the elongated hole corresponds to a length direction of the housing, and the slide button of each slidable element protrudes from the outer surface of the housing through a respective elongated hole. The elongated holes can limit the movement of the slide buttons, so that the peripheral electrodes can slide along the axial direction stably along the predetermined paths.

In some embodiments, one radially inside end of the slide button of each slidable element is vertically connected with the slidable rod, and the slide button has a recessed avoidance groove at a side wall thereof adjacent to the radially inside end thereof.

In some embodiments, the slidable rod is provided with a first receiving hole axially extending therethrough, and the peripheral electrode passes through the first receiving hole. The peripheral electrodes respectively pass through the slidable rods through the first receiving holes, which can effectively prevent the peripheral electrodes from crossing with each other.

In some embodiments, the slidable element has a substantially T-shaped configuration, the slide button is arranged adjacent to a proximal end of the slidable rod, and the slidable element further comprises a wedge disposed adjacent to the proximal end of the slidable rod and positioned on a side of the slidable rod opposite to the slide button, and the slidable rod, the slide button, and the wedge together form the substantially T-shaped configuration. The wedge not only helps the slidable element to slide stably in the axial direction, but also helps to avoid interference between adjacent slidable elements.

In some embodiments, the handle further comprises at least one support seat housed in the housing, the support seat abuts against an inner wall of the housing, and the slidable rods slidably passes through the at least one support seats. The support seat can not only support the housing to a certain extent and prevent the housing from being deformed, but also help the slidable rods to slide in the axial direction stably along the predetermined paths.

In some embodiments, an outer periphery of the support seat has at least one groove passing therethrough in the axial direction, and the inner wall of the housing encloses the groove to form an accommodating space. The accommodating space can be used to receive wires such as saline pipelines to prevent the wires from being crossing with each other.

In some embodiments, the handle comprises three support seats which are housed in the housing and spaced from each other in the axial direction, and the slidable rods slidably pass through the middle support seat and the distal support seat. Two support seats support the slidable rods to help the slidable rods to slide steadily in the axial direction. Furthermore, the proximal support seat can also be used for the conducting wires and sensor wires of the respective peripheral electrodes to pass through to prevent the wires from crossing with each other. In addition, the plurality of support seats can support the housing and prevent the housing from deforming.

In some embodiments, the catheter assembly comprises an outer catheter assembly connected with the handle and an inner catheter assembly connected with the handle, the inner catheter assembly is rotatable relative to the outer catheter assembly by driving the handle, the inner catheter assembly comprises a peripheral electrode assembly, and the peripheral electrode assembly comprises a plurality of peripheral electrodes circumferentially spaced from each other. The inner catheter assembly including the peripheral electrode assembly can be driven by the handle to rotate relative to the outer catheter assembly, so that the blood vessels can pass through the gaps between the adjacent peripheral electrodes of the peripheral electrode assembly, thereby avoiding puncturing the blood vessels, reducing operation failure or bringing the hidden treatment hazards or complications to the patient.

In some embodiments, the inner catheter assembly further comprises a support rod received in the outer catheter assembly, the support rod has a plurality of second receiving holes extending therethrough in the axial direction, and the peripheral electrodes respectively pass through the respective second receiving holes. The second receiving holes can be used for accommodating the peripheral electrodes of the peripheral electrode assembly to prevent the peripheral electrodes from crossing with each other. In some embodiments, the second receiving holes can also be used to receive other wires of the radiofrequency ablation catheter, such as saline pipeline, etc., so as to more effectively prevent the wires from crossing with each other.

In some embodiments, the handle further comprises an end cap rotatably connected with the housing, the outer catheter assembly is connected with the end cap, and the peripheral electrode assembly is rotatable relative to the outer catheter assembly by a rotation of the housing relative to the end cap through the slidable assembly. The inner catheter assembly is driven to rotate relative to the outer catheter assembly by rotating the housing, and the operation is stable and convenient.

The embodiments of the present invention also provide a radiofrequency ablation system, including the aforementioned radiofrequency ablation catheter. Since the radiofrequency ablation system includes the aforementioned radiofrequency ablation catheter, the aforementioned effects can also be achieved, which would not be repeated here.

Referring to FIG. 1, a radiofrequency ablation catheter 100 according to a first embodiment of the present invention includes a handle 10 and a catheter assembly 20 connected with the handle 10. The catheter assembly 20 includes an outer catheter assembly 40 connected with the handle 10 and an inner catheter assembly 60 connected with the handle 10. The inner catheter assembly 60 is configured to be driven by the handle 10 to rotate relative to the outer catheter assembly 40. Specifically, a proximal end of the outer catheter assembly 40 is connected with a distal end of the handle 10. The inner catheter assembly 60 includes a peripheral electrode assembly 61. A distal end of the peripheral electrode assembly 61 can be driven to protrude from a distal end of the outer catheter assembly 40. Preferably, the distal end of the peripheral electrode assembly 61 is configured to be driven by operating the handle 10 to protrude from the distal end of the outer catheter assembly 40. More preferably, the distal end of the peripheral electrode assembly 61 is configured to be driven to expand outwardly and protrude from the distal end of the outer catheter assembly 40 in a claw shape. The peripheral electrode assembly 61 includes a plurality of peripheral electrodes 610 spaced from each other in the circumferential direction.

It can be concluded that a user can operate the handle 10 to rotate the peripheral electrode assembly 61 relative to the outer catheter assembly 40. Therefore, during introducing the catheter assembly 20 of the radiofrequency ablation catheter 100 into the lung under the guidance of B-scan ultrasonography or CT, the blood vessel is allowed to pass through the gap between the adjacent peripheral electrodes 610 of the peripheral electrode assembly 61, thereby preventing the peripheral electrode assembly 61 from puncturing the blood vessel. Furthermore, rotating the outer catheter assembly 40 is not required, which is convenient for operation.

Figure 2:
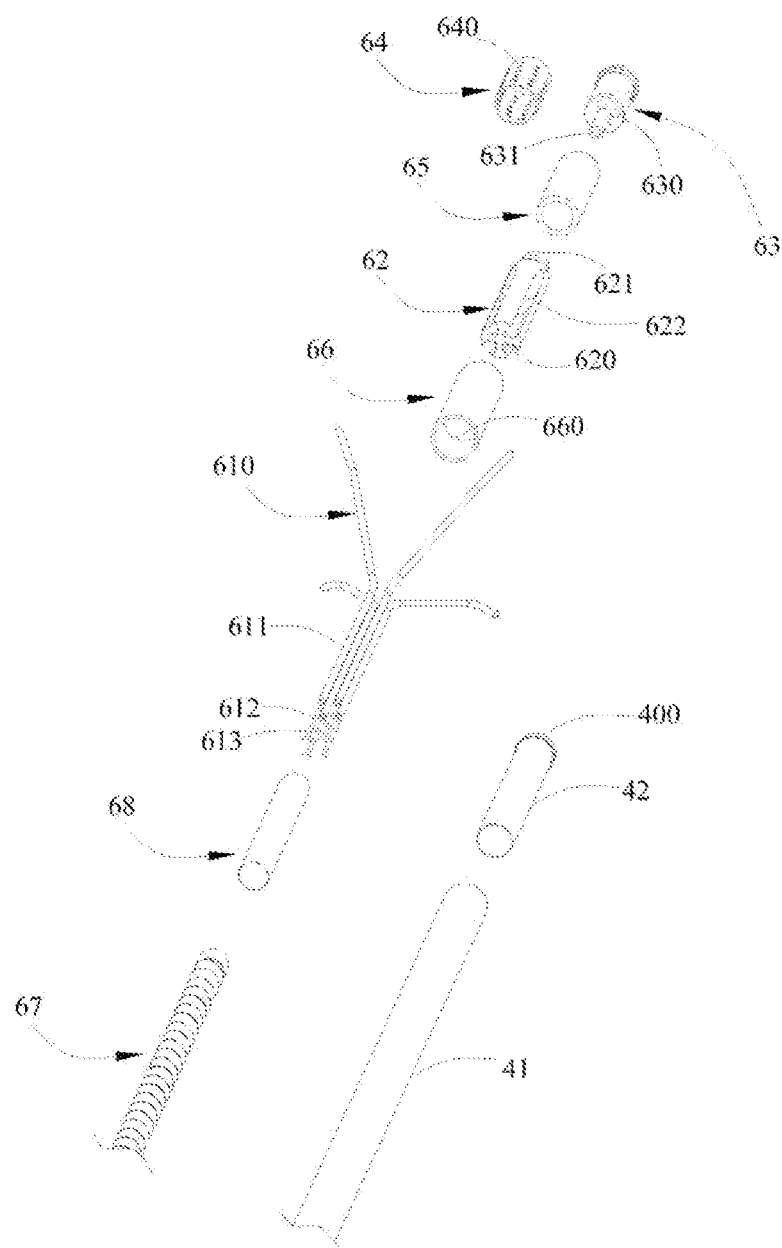
FIG. 2 is a partially exploded schematic view of the catheter assembly of the radiofrequency ablation catheter shown in FIG. 1.
Figure 3:
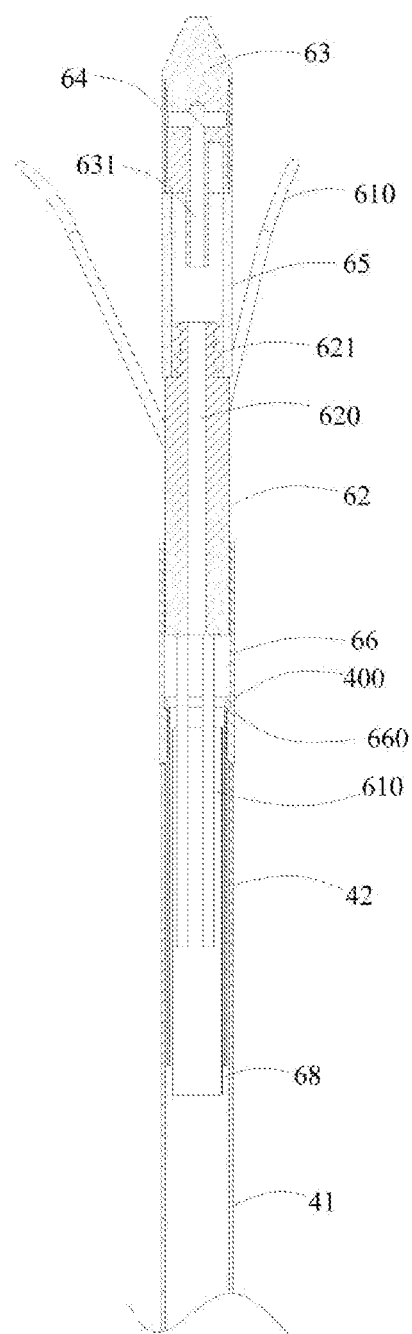
FIG. 3 is a partial cross-sectional view of the catheter assembly of the radiofrequency ablation catheter shown in FIG. 1.

Referring to FIGS. 1 to 3, in this embodiment, each peripheral peripheral electrode 610 of the peripheral electrode assembly 61 includes a probe 611, and a sensor wire 612 and a conducting wire 613 which are connected with the probe 611. After the peripheral electrodes 610 are introduced into the human tissue, such as the lung, the offset angles of the distal ends of the probes 611 of the peripheral electrodes 610 relative to the central axis of the radiofrequency ablation catheter 100 can be the same or different.

Optionally, the inner catheter assembly 60 further includes a support element 62 for supporting the peripheral electrode assembly 61. The support element 62 is generally cylindrical, and the peripheral electrodes 610 of the peripheral electrode assembly 61 are spaced from each other along the outer periphery of the support element 62. In this embodiment, the support element 62 is arranged at the distal end of the outer catheter assembly 40 and is rotatable, together with the peripheral electrode assembly 61, relative to the outer catheter assembly 40. Furthermore, the peripheral electrode assembly 61 is axially slidable relative to the support element 62.

In this embodiment, the inner catheter assembly 60 further includes a central electrode 63 fixedly connected with a distal end of the support element 62. Optionally, the support element 62 is provided with a through hole 620 extending therethrough in the axial direction at the center thereof for accommodating a sensor wire and a conducting wire for the central electrode 63 and a saline pipeline (not shown). A proximal side of the central electrode 63 is recessed to form a plurality of connecting grooves 630. The sensor wire and the conducting wire for the central electrode 63 are respectively received in respective connecting grooves 630 and then enter the through hole 620 of the support element 62. A hollow liquid inlet post 631 is provided on and protrudes from the center of the proximal side of the central electrode 63 for accommodating the saline pipeline extending from the through hole 620 of the support element 62. Preferably, the inner catheter assembly 60 further includes an infiltration cover 64 surrounding the outer peripheral surface of the central electrode 63, and a plurality of infiltration holes 640 are provided on and radially pass through the infiltration cover 64. Preferably, the infiltration holes 640 are evenly spaced from each other in the circumferential direction and the axial direction. The saline in the saline pipeline enters the central electrode 63 through the liquid inlet post 631, and flows out from the infiltration holes 640 through channels in the central electrode 63 (not shown), thereby being dispersed in the human tissue, such as the lung tissue.

In this embodiment, the inner catheter assembly 60 further includes a first connecting sleeve 65 for connecting the support element 62 and the central electrode 63. The first connecting sleeve 65 has a shape of a hollow cylinder, and preferably, is made of plastic. Preferably, a distal end of the first connecting sleeve 65 is melted and fitted with the infiltration cover 64 and/or the central electrode 63. More preferably, a metal wire (not shown) is used for connecting the first connecting sleeve 65 and the central electrode 63 to strengthen the connection therebetween. One end of the metal wire can be fixed within one of the connecting grooves 630 on the proximal side of the central electrode 63, the other end can be melted and connected with the first connecting sleeve 65. Preferably, a hollow threaded post 621 aligned with the through hole 620 can be provided on and protrude from a distal end of the support element 62. A proximal end of the first connecting sleeve 65 is melted and fitted to the outer circumference of the threaded post 621 to strengthen the connection between the first connecting sleeve 65 and the support element 62 and prevent the first connecting sleeve 65 and the elements connected with the first connecting sleeve 65, such as the central electrode 63, from falling off from the support element 62.

In this embodiment, a proximal side of the support element 62 is opposite to a distal side of the outer catheter assembly 40. Optionally, the proximal side of the support element 62 and the distal side of the outer catheter assembly 40 can abut against each other, so that the outer catheter assembly 40 can stably support the support element 62 in the axial direction, thereby avoiding a proximal movement of the support element 62 when rotating together with the peripheral electrode assembly 61. Alternatively, a certain distance may also be reserved between the proximal side of the support element 62 and the distal side of the outer catheter assembly 40, so that the outer catheter assembly 40 can support the support element 62 (through a rotatable element 66 which will be described below), and the support element 62 is also allowed to freely rotate together with the peripheral electrode assembly 61.

In this embodiment, the inner catheter assembly 60 further includes a rotatable element 66 for connecting the support element 62 and the outer catheter assembly 40. The rotatable element 66 is generally tubular. A distal end of the rotatable element 66 is fixedly connected with the support element 62, for example, by interference fit or welding. A proximal end of the rotatable element 66 is rotatably connected with the outer catheter assembly 40.

Preferably, the outer wall of the support element 62 has a plurality of first grooves 622 spaced in the circumferential direction, and the length direction of the first grooves 622 corresponds to the length direction of the support element 62. In this embodiment, the length direction corresponds to the axial direction. Each peripheral electrode 610 is slidably received in a respective first groove 622, and the distal end of each peripheral electrode 610 can slide into or out from the rotatable element 66. The first groove 622 helps the peripheral electrode 610 to slide steadily in the axial direction, thereby avoiding deflection of the peripheral electrode 610. Preferably, the rotatable element 66 covers a section of the plurality of first grooves 622 along the length direction, so that the distal section of the plurality of first grooves 622 is still visible, which is convenient for the user to determine the rotation direction of the support element 62 and thus the rotation direction of the peripheral electrode assembly 61, so that the peripheral electrode assembly 61 is allowed to conveniently avoid the blood vessels.

Preferably, the inner wall of the rotatable element 66 is provided with a first protrusion 660 protruding radially and inwardly, and the distal end of the outer catheter assembly 40 is provided with a second protrusion 400 protruding radially and outwardly. The second protrusion 400 is rotatably supported at a distal end of the first protrusion 660, so that the rotatable element 66 is allowed to rotate with the support element 62 and the peripheral electrode assembly 61 relative to the outer catheter assembly 40, and a distal movement of the rotatable element 66 when rotating together with the support element 62 and the peripheral electrode assembly 61 relative to the outer catheter assembly 40 is also avoided. Furthermore, the rotatable element 66 and the elements connected, such as the support element 62, are also prevented from falling off from the outer catheter assembly 40.

Preferably, the outer catheter assembly 40 includes an outer sheath 41 and a connecting tube 42 that are fixedly connected with each other. A proximal end of the outer sheath 41 is connected with the distal end of the handle 10. Preferably, the proximal end of the outer sheath 41 is fixedly connected with the distal end of the handle 10. The connecting tube 42 is received within a distal section of the outer sheath 41 and is fixedly connected with the outer sheath 41 by, for example, interference fit or welding. The second protrusion 400 is provided at a distal side of the connecting tube 42 for connecting with the rotatable element 66.

More preferably, a distal side of the outer sheath 41 abuts against a proximal side of the rotatable element 66, thereby avoiding a proximal movement of the rotatable element 66 when rotating together with the support element 62 and the peripheral electrode assembly 61.

Optionally, in this embodiment, the inner catheter assembly 60 further includes a spring tube 67 received within the outer catheter assembly 40, and a distal end of the spring tube 67 is fixedly connected with the probes 611 of the peripheral electrode assembly 61 directly or indirectly. In this embodiment, the inner catheter assembly 60 further includes a second connecting sleeve 68 for connecting the spring tube 67 and the probes 611 of the peripheral electrode assembly 61. A proximal end of the second connecting sleeve 68 surrounds around a distal outer periphery of the spring tube 67 and is fixedly connected with the distal section of the spring tube 67. A distal end of the second connecting sleeve 68 surrounds around proximal ends of the probes 611 of the peripheral electrode assembly 61 and is fixedly connected with the proximal ends of the probes 611 of the peripheral electrode assembly 61.

In this embodiment, the conducting wires 613 and the sensor wires 612 of the peripheral electrode assembly 61 extend inside of the spring tube 67 towards the proximal end (handle 10). The saline pipeline and the sensor wire and conducting wire for the central electrode 63 extend proximally from the through hole 620 of the support element 62 and through an annular gap between the second connecting sleeve 68 and the connecting tube 42, and further extend through an annular gap between the spring tube 67 and the outer sheath 41 towards the proximal end (handle 10).

Figure 4:
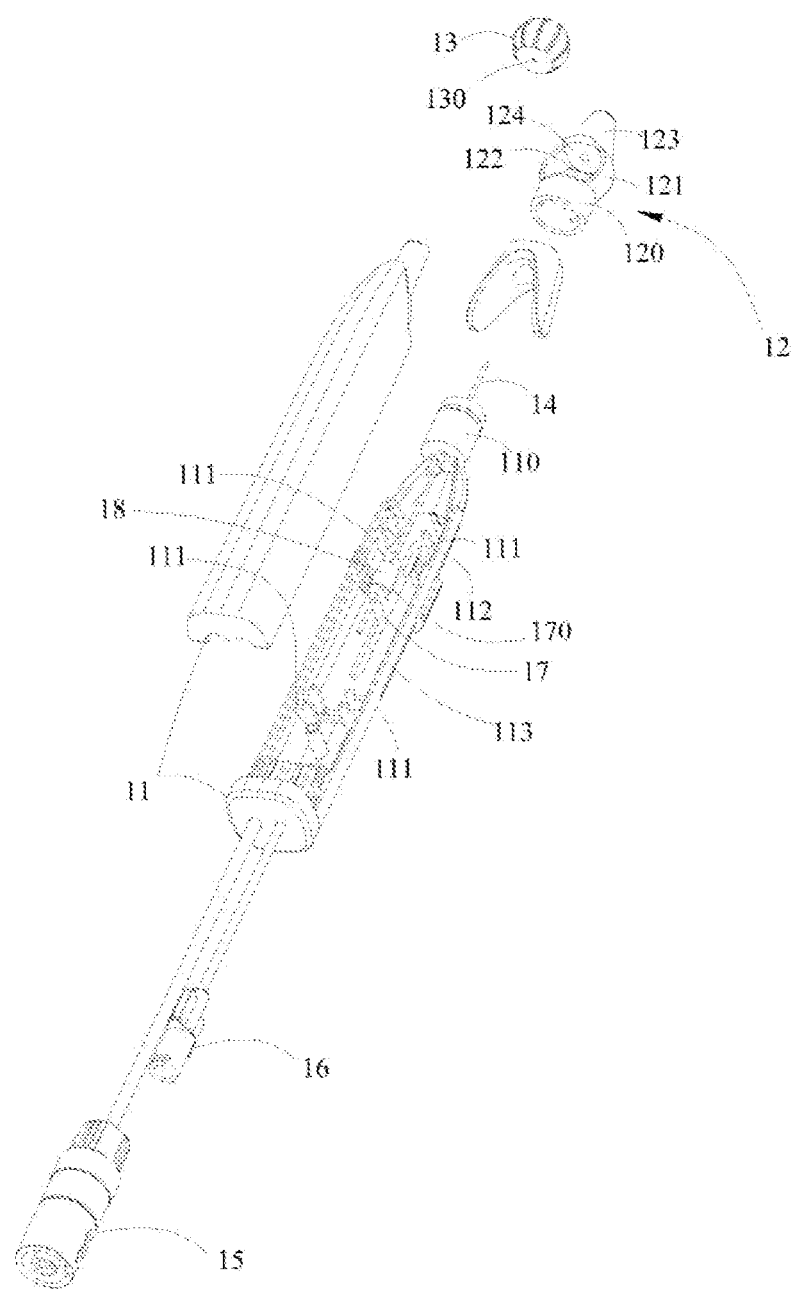
FIG. 4 is a partially exploded schematic view of the handle of the radiofrequency ablation catheter shown in FIG. 1.

Referring to FIGS. 1 and 4, in this embodiment, the handle 10 includes a housing 11, an end cap 12 connected with a distal end of the housing 11, a rotatable ball 13 rotatably received in the end cap 12, and a push-pull rod 14 connected with the rotatable ball 13 in an anti-rotation manner.

Specifically, in this embodiment, the housing 11 generally has a shape of a hollow cylinder, and includes two half-housings that are connected with each other in a snap-fit connection. A distal end of one of the half-housings has a cylindrical inner connector 110. The end cap 12 includes a hollow cylindrical outer connector 120 that covers an outer circumference of the inner connector 110 and is connected with the inner connector 110, a plurality of arc-shaped connecting pieces 121 that are fixedly connected with a distal end of the outer connector 120 and enclose a space 122, and a tapered portion 123 fixedly connected with distal ends of the plurality of arc-shaped connecting pieces 121. An opening 124 is defined between adjacent arc-shaped connecting pieces 121. The outer sheath 41 is inserted into the tapered portion 123 and is fixedly connected with the tapered portion 123 in this embodiment. The rotatable ball 13 is received in the space 122, and the user can rotate the rotatable ball 13 at the opening 124. A proximal end of the push-pull rod 14 is received in the housing 11, and a distal end thereof passed through the inner connector 110, the rotatable ball 13 into the outer sheath 41, and is connected with the spring tube 67 directly or indirectly. In this embodiment, the push-pull rod 14 is directly connected with the spring tube 67.

Preferably, the push-pull rod 14 is hollow, and the conducting wires 613 and the sensor wires 612 of the peripheral electrode assembly 61 extend proximally from the aforementioned spring tube 67 into the push-pull rod 14 and further extend proximally until connected with an electrode connector 15 that is fixed with a proximal end of the housing 11. More preferably, the housing 11 has an accommodating space 111 for accommodating the saline pipeline and the sensor wires and the conducting wires for the central electrode 63 that extend proximally from the annular gap between the spring tube 67 and the outer sheath 41 into the housing 11 as described above. Preferably, the accommodating space 111 is enclosed by an inner wall of the housing 11 and a curved post 112 (such as an L-shaped post) protruding from the inner wall. More preferably, the housing 11 has two accommodating spaces 111 which are opposite to each other in the radial direction. The sensor wire and conducting wire for the central electrode 63 are accommodated in one accommodating space 111 and extend proximally until connected with the electrode connector 15 that is fixed with the proximal end of the housing 11. The saline pipeline is accommodated in the other accommodating space 111 and extends proximally until connected with a saline pipeline connector 16 that is fixed with the proximal end of the housing 11.

When a rotation of the peripheral electrode assembly 61 is required, the user can rotate the rotatable ball 13. As the rotatable ball 13 is connected with the push-pull rod 14 in an anti-rotation manner, the push-pull rod 14 will rotate together with the rotatable ball 13. The rotation of the push-pull rod 14 drives the inner catheter assembly 60 (including the spring tube 67, the second connecting sleeve 68, the peripheral electrode assembly 61, the support element 62, the rotatable element 66, the first connecting sleeve 65, and the central electrode 63 and the infiltration cover 64 connected with the connecting sleeve 65) to rotate.

In this embodiment, the peripheral electrode assembly 61 can be driven to move in the axial direction relative to the support element 62 and the rotatable element 66 by driving the push-pull rod 14 to move in the axial direction, so that the distal ends of the probes 611 of the peripheral electrode assembly 61 can move out from the rotatable element 66 or into the rotatable element 66.

Specifically, the handle 10 further includes a slidable assembly which includes a slide button 17 slidably connected with the housing 11, a fixing block 18 rotatably connected with the slide button 17, and the push-pull rod 14. More specifically, a side wall of the housing 11 has an elongated hole 113 that passes through the housing 11 in the radial direction. The slide button 17 is received in the elongated hole 113, with a portion thereof protruding from an outer surface of the housing 11 for the user to move the slide button 17, and the other portion thereof received in the housing 11. The other portion of the slide button 17 has a receiving groove 170 that is opened at a radial inside thereof. The fixing block 18 is received in the receiving groove 170 and preferably abuts against two opposite walls of the receiving groove 170 in the axial direction. More preferably, the fixing block 18 is cylindrical, so that the fixing block 18 can rotate stably relative to the slide button 17. The proximal end of the push-pull rod 14 passes through the slide button 17 and the fixing block 18, in which the push-pull rod 14 is fixedly connected with the fixing block 18 by, for example, interference fit, and the push-pull rod 14 is movably connected with the slide button 17 by, for example, clearance fit, so that the push-pull rod 14 is allowed to rotate relative to the slide button 17, and move by the movement of the slide button 17 through the fixing block 18, thereby driving the spring tube 67, the second connecting sleeve 68, and the peripheral electrode assembly 61 to move in the axial direction through the push-pull rod 14.

Preferably, the rotatable ball 13 has a noncircular hole 130 at the center thereof, such as a square hole, an elliptical hole, etc., and the push-pull rod 14 passes through the rotatable ball 13 through the noncircular hole 130 and engages with the wall of the noncircular hole 130, so that the push-pull rod 14 is allowed to move in the axial direction relative to the rotatable ball 13 and to rotate together with the rotatable ball 13.

When using the ablation catheter according to the first embodiment, the distal end of the peripheral electrode assembly 61 is initially received in the rotatable element 66. The distal end of the catheter assembly 20 (i.e., the central electrode 63) can be used to percutaneously puncture into the target tumor. Then, the rotatable ball 13 can be rotated, wherein the rotation direction can be determined through the visible section (distal section) of the four first grooves 622 of the support element 62, so that the four first grooves 622 are allowed to avoid blood vessels. After the central electrode 63 is rotated to a safe and desired position, the central electrode 63 can be inserted into the lesion. Thereafter, the slide button 17 can be pushed to push the peripheral electrode assembly 61 out of the rotatable element 66 to obtain the surrounding conditions of the central electrode 63, such as temperature and impedance, thereby determining the progress of ablation. Since the first grooves 622 avoid the blood vessels, the peripheral electrodes 610 of the peripheral electrode assembly 61 pushed out from the rotatable element 66 will also avoid the blood vessels without puncturing the blood vessel.

Figure 5:
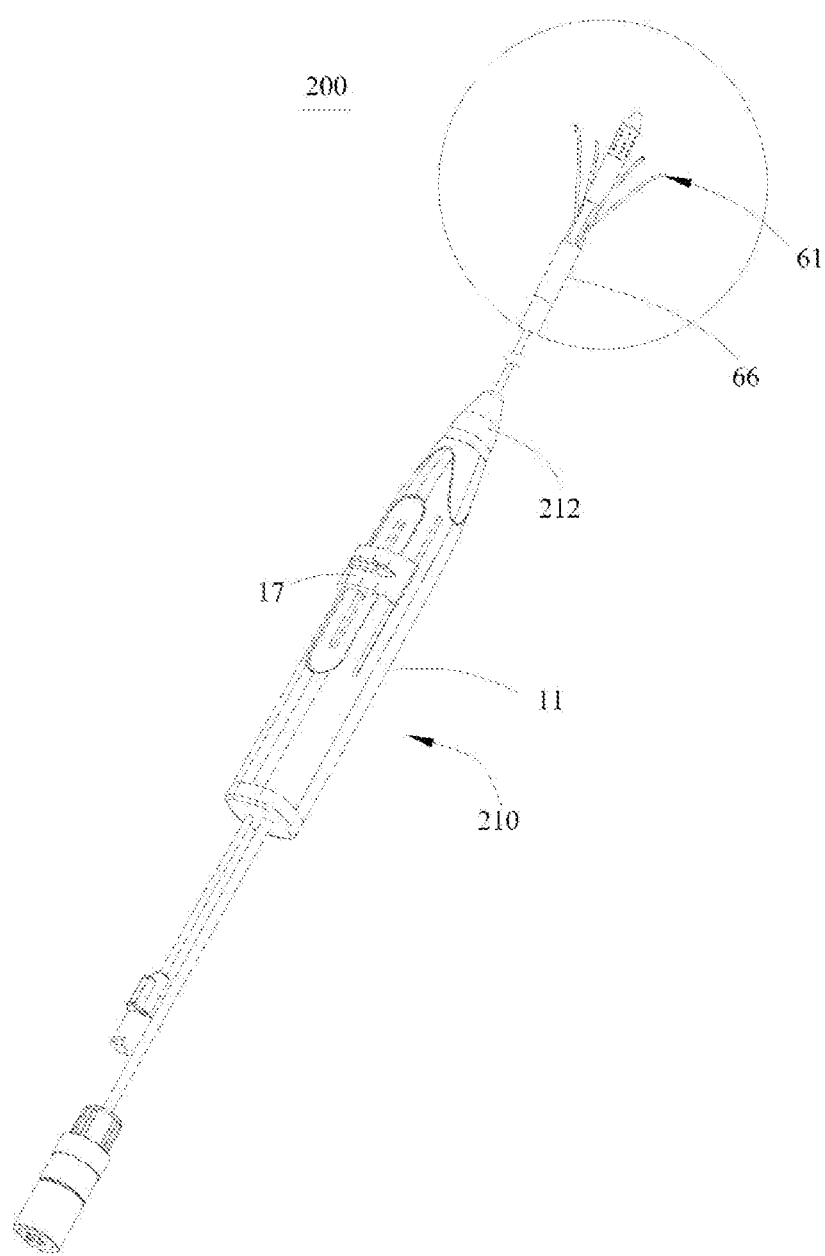
FIG. 5 is a schematic view of the radiofrequency ablation catheter according to a second embodiment of the present invention.
Figure 6:
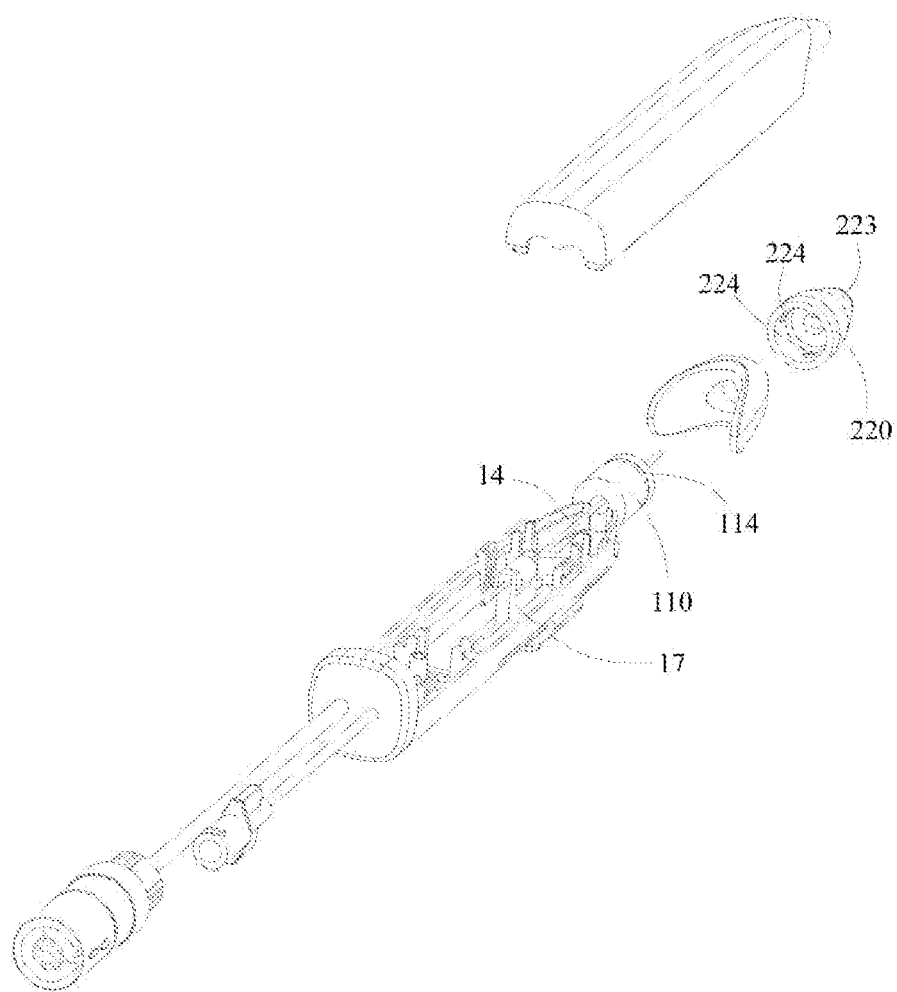
FIG. 6 is a partial exploded schematic view of the handle of the radiofrequency ablation catheter shown in FIG. 5.

Referring to FIGS. 5 and 6, the radiofrequency ablation catheter 200 according to a second embodiment of the present invention is similar to the radiofrequency ablation catheter 100 according to the first embodiment, and the radiofrequency ablation catheter 200 according to a second embodiment of the present invention differs from the radiofrequency ablation catheter 100 according to the first embodiment in the configuration for rotating the peripheral electrode assembly 61.

Specifically, the handle 210 of the radiofrequency ablation catheter 200 according to the second embodiment of the present invention no longer includes the end cap 12 and the rotatable ball 13 as shown in the first embodiment. In this second embodiment, the end cap 212 of the handle 210 only includes a hollow cylindrical outer connector 220 that covers the outer circumference of the inner connector 110 and is rotatably connected with the inner connector 110, and a tapered portion 223 fixedly connected with a distal end of the outer connector 220. The outer sheath 41 is inserted into the tapered portion 223, and is fixedly connected with the tapered portion 223 in this embodiment.

The inner connector 110 and the outer connector 220 can be rotatably connected using the following structures: the outer circumference of the inner connector 110 has an annular recessed groove 114, and an inner wall of the outer connector 220 has one or more arc-shaped sliding rings 224 or an annular sliding ring 224 protruding therefrom, and the sliding ring 224 is rotatably received in the annular groove 114. Alternatively, in other embodiments, the inner connector 110 and the outer connector 220 can be rotatably connected using other structures.

Furthermore, the push-pull rod 14 in this embodiment is no longer in clearance fit with the slide button 17. Instead, the push-pull rod 14 in this embodiment is fixedly connected with the slide button 17 by, for example, interference fit.

In use, the user can hold the end cap 212 with one hand and rotate the housing 11 of the handle 210 with the other hand. Since the push-pull rod 14 is fixedly connected with the slide button 17 in this embodiment, the push-pull rod 14 will also rotate together with the housing 11, and then the peripheral electrode assembly 61 will be rotated through the spring tube 67 and the second connecting sleeve 68. When a movement of the peripheral electrode assembly 61 is required, the slide button 17 can be pushed or pulled to push or pull the distal ends of the probes 611 of the peripheral electrode assembly 61 out of the rotatable element 66 or into the rotatable element 66.

Figure 7:
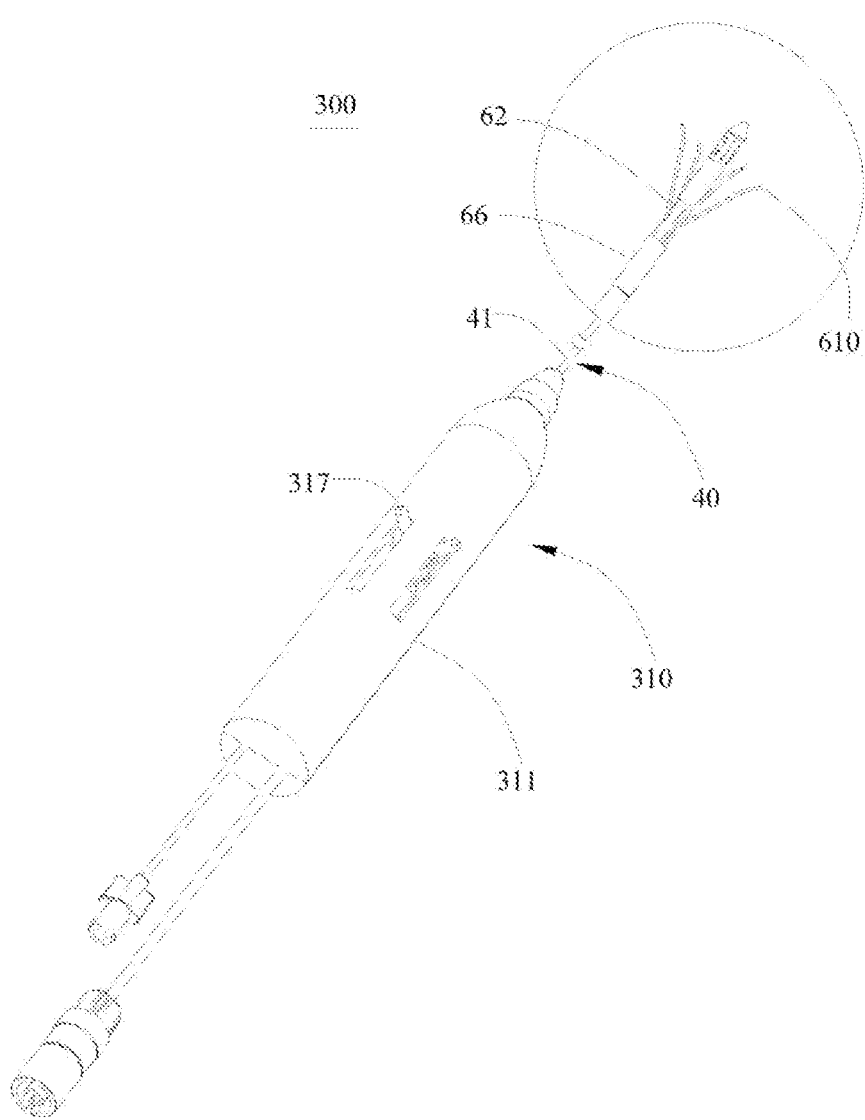
FIG. 7 is a schematic view of the radiofrequency ablation catheter according to a third embodiment of the present invention.
Figure 8:
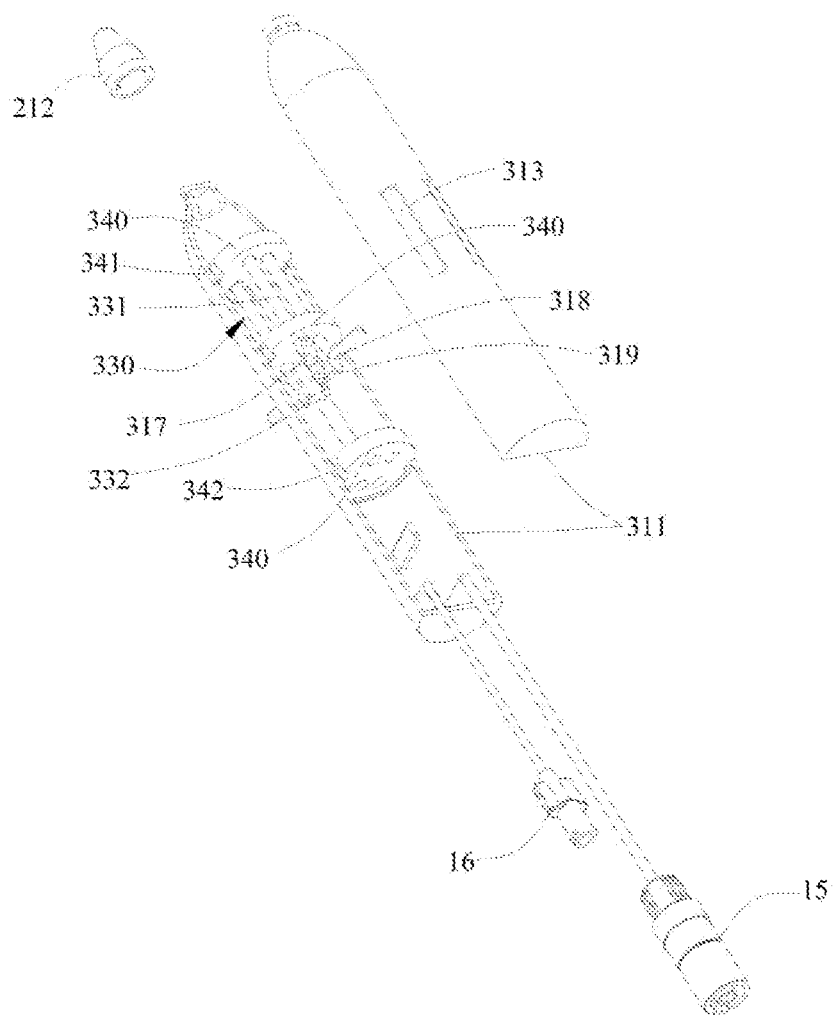
FIG. 8 is a partial exploded schematic view of the handle of the radiofrequency ablation catheter shown in FIG. 7.
Figure 9:
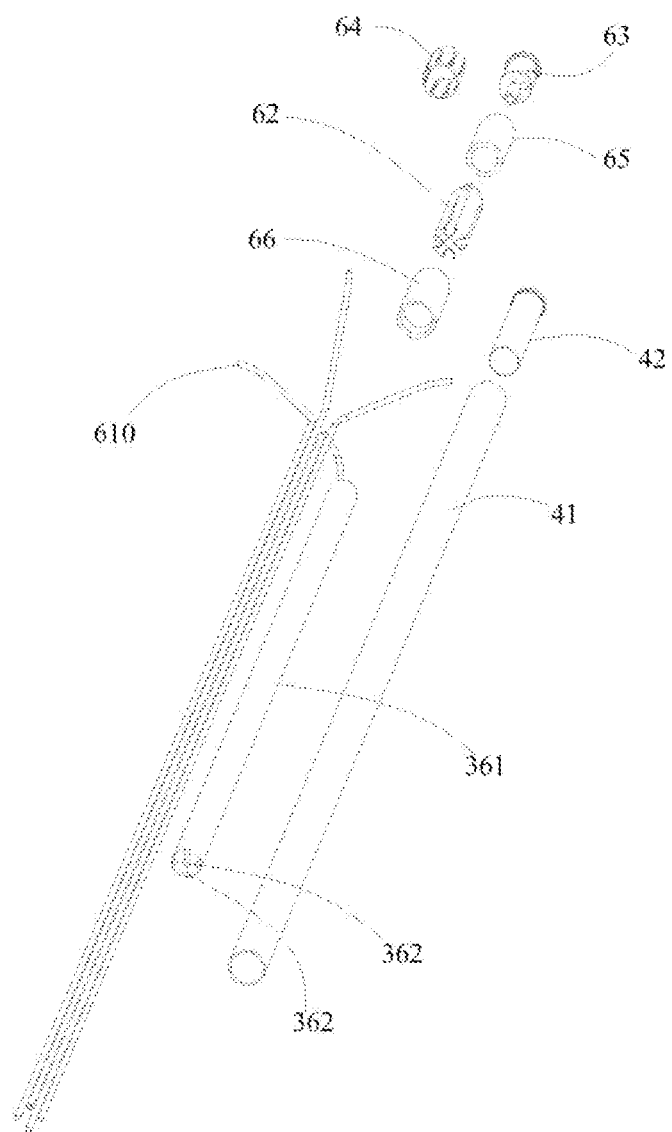
FIG. 9 is a partially exploded schematic view of the catheter assembly of the radiofrequency ablation catheter shown in FIG. 7.

Referring to FIGS. 7-9, the radiofrequency ablation catheter 300 according to a third embodiment of the present invention is similar to the radiofrequency ablation catheter 200 according to the second embodiment, and the radiofrequency ablation catheter 300 according to the third embodiment of the present invention mainly differs from the radiofrequency ablation catheter 200 according to the second embodiment in the slidable assembly.

Specifically, in this embodiment, the slidable assembly of the radiofrequency ablation catheter 300 includes a plurality of slidable elements 330 that are independently slidable relative to the housing 311 in the axial direction. Each peripheral electrode 610 of the peripheral electrode assembly 61 is fixedly connected with a respective slidable element 330 and is slidable relative to the housing 311 in the axial direction.

It can be concluded that when using the radiofrequency ablation catheter 300 according to this embodiment, each peripheral electrode 610 can be respectively controlled to move in the axial direction so that each peripheral electrode 610 can be respectively controlled by controlling each slidable element 330 separately to move to a desired lesion site as required, thereby improving the positioning effect of each peripheral electrode 610 and thus improving the reliability of ablation monitoring results.

Optionally, the slidable element 330 includes a slidable rod 331 slidably arranged in the housing 311 and a slide button 317 fixedly connected with the slidable rod 331 and protruding from the outer surface of the housing 311. The peripheral electrode 610 is fixedly connected with a respective slidable rod 331. The slide button 317 is slidably connected with the housing 311.

Preferably, the handle 310 further includes at least one support seat 340 received in the housing 311. In this embodiment, the support seat 340 generally has a shape of a disc, and its outer peripheral wall abuts against and is fixedly connected with the inner peripheral wall of the housing 311. The slidable rod 331 axially passes through the at least one support seat 340 and is slidably connected with the at least one support seat 340. In this embodiment, the handle 310 includes three support seats 340 axially spaced from each other. The slidable rod 331 is slidably connected with the middle support seat 340 and the distal support seat 340. The support seats 340 can not only limit the movement of the slidable elements 330, so that the slidable elements 330 can move stably in the axial direction without deflection, but the support seats 340 can also support the housing 311 to prevent deformation of the housing 311.

More preferably, the outer periphery of the support seat 340 has at least one second groove 341 through the support seat 340 in the axial direction, and the inner wall of the housing 311 encloses the second groove 341 to form an accommodating space 342. In this embodiment, the outer periphery of each support seat 340 has two second grooves 341 opposite in the radial direction. The saline pipeline extends proximally from the through hole 620 of the support element 62 through the connecting tube 42 and the outer sheath 41 of the outer catheter assembly 40 into the housing 311, and through the accommodating spaces 342 at one radial side enclosed by the respective support seats 340 and the housing 311 until connected with the saline pipe connector 16 that is fixed with the proximal end of the housing 311. The sensor wire and conducting wire for the central electrode 63 extend proximally from the through hole 620 of the support element 62 through the connecting tube 42 and the outer sheath 41 of the outer catheter assembly 40 into the housing 311, and through the accommodating spaces 342 at the other radial side enclosed by the respective support seats 340 and the housing 311 until connected with the electrode connector 15 fixed with the proximal end of the housing 311. The accommodating spaces 342 can prevent the wires of the radiofrequency ablation catheter 300 from crossing with each other.

Preferably, the slidable rod 331 is provided with a first receiving hole 332 extending therethrough in the axial direction. The probes 611 of the peripheral electrodes 610 extend from the rotatable element 66 through the connecting tube 42 and the outer sheath 41 of the outer catheter assembly 40 to the respective first receiving holes 332 of the respective slidable rods 331 in the housing 311 and fixedly connected with the respective slidable rods 331. The sensor wires 612 and the conducting wires 613 of the respective peripheral electrodes 610 further extend proximally from the first receiving holes 332 through the proximal support seat 340 until connected with the electrode connector 15 fixed with the proximal end of the housing 311. The first receiving holes 332 and the proximal support seat 340 can effectively prevent the wires of the radiofrequency ablation catheter 300 from crossing with each other.

Preferably, the housing 311 has a plurality of elongated holes 313 spaced from each other along the circumferential direction. Each elongated hole 313 radially passes through the housing 311, and the length direction of each elongated hole 313 corresponds to the length direction of the housing 311. In this embodiment, the length direction corresponds to the axial direction. The slide button 317 of each slidable element 330 protrudes from the outer surface of the housing 311 through a respective elongated hole 313. The slide button 317 is limited by the elongated hole 313, so that the slide button 317 can stably slide in the elongated hole 313 in the axial direction, thereby effectively preventing the slide button 317 from deflection in the circumferential direction.

In this embodiment, one end of the slide button 317 of each slidable element 330 is vertically connected with the respective slidable rod 331, and preferably, the slide button 317 is arranged adjacent to the proximal end of the respective slidable rod 331. The side wall of the slide button 317 adjacent to its radially inside end has a recessed avoidance groove 318, and preferably the avoidance groove 318 is located on a side wall of the slide button adjacent to the proximal end of the slidable rod 331 to avoid interference between the slidable element 330 and the surrounding elements and/or wiring etc.

Preferably, the slidable element 330 further includes a wedge 319 arranged adjacent to the proximal end of the slidable rod 331 and located on the side of the slidable rod 331 opposite to the slide button 317. The slidable rod 331, the slide button 317, and the wedge 319 together form a substantially T-shaped structure. Specifically, the wedge 319 gradually tapers from the side wall of the slidable rod 331 toward the center of the slidable assembly (i.e., the center of the four slidable elements 330 or the center axis of the handle 310). The wedges 319 not only help the slidable elements 330 to slide stably in the axial direction, but also help to avoid interference between adjacent slidable elements 331.

More preferably, the inner catheter assembly 360 of the radiofrequency ablation catheter 300 according to this embodiment further includes a support rod 361 housed in the outer catheter assembly 40, and the support rod 361 has a plurality of second receiving holes 362 extending therethrough in the axial direction. Preferably, the support rod 361 has a second central receiving hole 362, and a plurality of second peripheral receiving holes 362 surrounding the second central receiving hole 362. Each of the peripheral electrodes 610 passes through a respective second peripheral receiving hole 362. The saline pipeline and the sensor wire and conducting wire for the central electrode 63 pass through the second central receiving hole 362. In other words, in this embodiment, the inner catheter assembly 360 no longer includes the spring tube 67 and the second connecting sleeve 68. The second receiving holes 362 can effectively prevent the wires of the radiofrequency ablation catheter 300 from crossing with each other.

In use, the user can hold the end cap 212 with one hand and rotate the housing 311 of the handle 310 with the other hand. Since the peripheral electrode assembly 61 is fixedly connected with the slidable assembly of the handle 310, the peripheral electrode assembly 61 will also rotate together with the housing 311. When a movement of one or more peripheral electrodes 610 of the peripheral electrode assembly 61 is required, the respective one or more slidable elements 330 can be pushed or pulled to push or pull the distal ends of the probe 611 of the respective peripheral electrodes 610 out of the rotatable element 66 or into the rotatable element 66.

Figure 10:
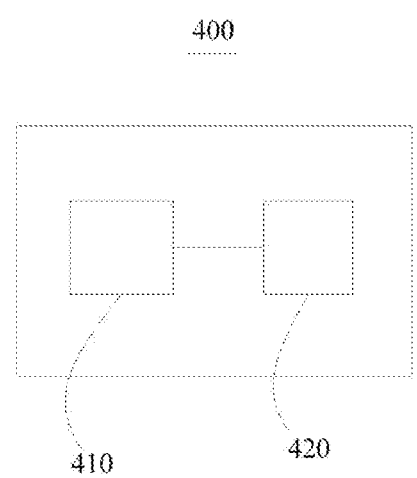
FIG. 10 is a schematic view of a radiofrequency ablation system according to a fourth embodiment of the present invention.

Referring to FIG. 10, a fourth embodiment of the present invention provides a radiofrequency ablation system 400 which includes a radiofrequency generator 410 (ablatograph), and a radiofrequency ablation catheter 420 connected with the radiofrequency generator 410 according to any one of the foregoing embodiments. The radiofrequency generator 410 provides electrical signals for the central electrode 63 and the peripheral electrode assembly 61 of the radiofrequency ablation catheter 420 to make the central electrode 63 and the peripheral electrode assembly 61 work.

In the present invention, unless specified or defined, a first feature provided "above" or "below" a second feature includes the situation where the first feature and the second feature are in direct contact with each other, or the situation where the first feature and the second feature are in indirect contact with each other through a further feature.

Moreover, the first feature provided "on", "above", and "over" the second feature means that the first feature can be directly above or obliquely above the second feature, or the level of the first feature is higher than that of the second feature. The first feature provided "down", "below" and "under" the second feature means that the first feature is directly below or obliquely below the second feature, or the level of the first feature is lower than that of the second feature.

In the description of this specification, the terms of "one embodiment", "some embodiments", "examples", "specific examples" or "some examples", etc., means the specific features, structure, materials or features described in conjunction with the embodiment or example are included in at least one embodiment or example of the present invention. In this specification, the exemplary recitations of the above-mentioned terms do not necessarily refer to the same embodiment or example. Moreover, the described specific features, structures, materials or features can be combined in any one or more embodiments or examples in a suitable manner. In addition, those skilled in the art can combine the different embodiments or examples and the features of the different embodiments or examples described in this specification without mutual contradiction.

Finally, it should be noted that the above embodiments are only used to illustrate the technical solutions of the present invention, not to limit them; although the present invention has been described in detail with reference to the foregoing embodiments, those skilled persons in the art should understand that: the technical solutions recorded in the foregoing embodiments can still be modified, or some or all of the technical features can be equivalently replaced; and these modifications or replacements do not make the essence of the corresponding technical solutions deviate from the scope of technical solutions of the embodiments of the present invention.

The invention claimed is:

1. A radiofrequency ablation catheter, comprising:
a handle which has a proximal end and a distal end,
an outer catheter assembly which has a proximal end and a distal end, and
an inner catheter assembly which has a proximal end and a distal end, wherein the inner catheter assembly comprises a peripheral electrode assembly, and the peripheral electrode assembly comprises a plurality of peripheral electrodes circumferentially spaced from each other;
wherein the proximal end of the outer catheter assembly is connected with the distal end of the handle; the proximal end of the inner catheter assembly is connected with the distal end of the handle; and the inner catheter assembly is rotatable relative to the outer catheter assembly by driving the handle;
wherein the inner catheter assembly further comprises a support element for supporting the peripheral electrode assembly, wherein the plurality of peripheral electrodes of the peripheral electrode assembly are spaced from each other in a circumferential direction of the support element, and the support element is rotatably connected with the outer catheter assembly;
wherein the inner catheter assembly further comprises a rotatable element for connecting the outer catheter assembly and the support element, and the rotatable element and the support element are separate components that are fixedly assembled together; and
wherein a peripheral wall of the support element is recessed to form a plurality of grooves circumferentially spaced from each other, and a length direction of the plurality of grooves corresponds to a length direction of the support element; the rotatable element covers a section of the plurality of grooves along the length direction thereof, and the plurality of peripheral electrodes are slidably received in respective grooves of the plurality of grooves, and are receivable in the rotatable element or slidable out from the rotatable element.

2. The radiofrequency ablation catheter according to claim 1, wherein the support element has a proximal end and a distal end, and a proximal side of the support is opposite to a distal side of the outer catheter assembly; the rotatable element has a proximal end and a distal end, wherein the distal end of the rotatable element is fixedly connected with the support element, and the proximal end of the rotatable element is rotatably connected with the outer catheter assembly.

3. The radiofrequency ablation catheter according to claim 2, wherein the rotatable element is tubular, an inner wall of the rotatable element is provided with a first protrusion, and the distal end of the outer catheter assembly is provided with a second protrusion, and the first protrusion is rotatably engaged with the second protrusion.

4. The radiofrequency ablation catheter according to claim 3, wherein the outer catheter assembly comprises an outer sheath having a proximal end and a distal end, and a connecting tube fixedly connected with the distal end of the outer sheath, and wherein the proximal end of the outer sheath is connected with the distal end of the handle, the connecting tube has a proximal end and a distal end, and the second protrusion is provided on a distal side of the connecting tube, and wherein the proximal end of the connecting tube is received in the distal end of the outer sheath, and a distal side of the outer sheath abuts against a proximal side of the rotatable member.

5. The radiofrequency ablation catheter according to claim 1, wherein the handle comprises a housing having a proximal end and a distal end, and an end cap rotatably connected with the distal end of the housing, and wherein the proximal end of the outer catheter assembly is connected with the end cap, and the inner catheter assembly is rotatable relative to the outer catheter assembly by a rotation of the housing relative to the end cap.

6. The radiofrequency ablation catheter according to claim 5, wherein the handle further comprises a slidable assembly slidably connected with the housing, and the slidable assembly is connected with the peripheral electrode assembly for driving the peripheral electrode assembly to move in an axial direction, and the peripheral electrode assembly is rotatable relative to the outer catheter assembly by the rotation of the housing relative to the end cap through the slidable assembly.

7. The radiofrequency ablation catheter according to claim 6, wherein the slidable assembly comprises a plurality of slidable elements slidably connected with the housing, and each of the plurality of slidable elements is at least partially arranged inside the housing, and a proximal end of each of the plurality of peripheral electrodes extends into the housing and is fixedly connected with a respective slidable element of the plurality of slidable elements.

8. The radiofrequency ablation catheter according to claim 6, wherein the slidable assembly comprises a push-pull rod at least partially arranged in the housing and slidably connected with the housing, and the inner catheter assembly further comprises a spring tube received in the outer catheter assembly, the spring tube has a proximal end and a distal end, the proximal end of the spring tube is fixedly connected with the push-pull rod, and the distal end of the spring tube is fixedly connected with the plurality of peripheral electrodes.

9. A radiofrequency ablation system, comprising the radiofrequency ablation catheter according to claim 1.

10. A radiofrequency ablation catheter, comprising:
a handle which has a proximal end and a distal end,
an outer catheter assembly which has a proximal end and a distal end, and
an inner catheter assembly which has a proximal end and a distal end, wherein the inner catheter assembly comprises a peripheral electrode assembly, and the peripheral electrode assembly comprises a plurality of peripheral electrodes circumferentially spaced from each other;
wherein the proximal end of the outer catheter assembly is connected with the distal end of the handle; the proximal end of the inner catheter assembly is connected with the distal end of the handle; and the inner catheter assembly is rotatable relative to the outer catheter assembly by driving the handle, wherein the handle comprises a housing having a proximal end and a distal end, an end cap connected with the distal end of the housing, a rotatable ball received in the end cap and a push-pull rod anti-rotationally connected with the rotatable ball, the proximal end of the outer catheter assembly is connected with the end cap, the push-pull rod is connected with the inner catheter assembly, and the inner catheter assembly is rotatable relative to the outer catheter assembly by a rotation of the rotatable ball relative to the end cap through the push-pull rod.

11. The radiofrequency ablation catheter according to claim 10, wherein the handle further comprises a slide button slidably connected with the housing, and a fixing block rotatably connected with the slide button, and wherein the push-pull rod is fixedly connected with the fixing block and is axially slidable relative to the rotatable ball, and the push-pull rod is axially slidable by an axial movement of the slide button relative to the housing through the fixing block.

12. The radiofrequency ablation catheter according to claim 11, wherein the rotatable ball is provided with a noncircular hole, and the push-pull rod passes through the rotatable ball through the noncircular hole and is engaged with walls of the noncircular holes.

13. The radiofrequency ablation catheter according to claim 10, wherein the inner catheter assembly further comprises a support element for supporting the peripheral electrode assembly, wherein the plurality of peripheral electrodes of the peripheral electrode assembly are spaced from each other in a circumferential direction of the support element, and the support element is rotatably connected with the outer catheter assembly.

14. The radiofrequency ablation catheter according to claim 13, wherein the support element has a proximal end and a distal end, and a proximal side of the support is opposite to a distal side of the outer catheter assembly; the inner catheter assembly further comprises a rotatable element for connecting the outer catheter assembly and the support element; the rotatable element has a proximal end and a distal end, wherein the distal end of the rotatable element is fixedly connected with the support element, and the proximal end of the rotatable element is rotatably connected with the outer catheter assembly.

15. The radiofrequency ablation catheter according to claim 14, wherein an outer wall of the support element has a plurality of grooves circumferentially spaced from each other, and a length direction of the plurality of grooves corresponds to a length direction of the support element; the rotatable element covers a section of the plurality of grooves along the length direction thereof, and the plurality of peripheral electrodes are slidably received in respective grooves of the plurality of grooves, and are receivable in the rotatable element or slidable out from the rotatable element.

16. The radiofrequency ablation catheter according to claim 14, wherein the rotatable element is tubular, an inner wall of the rotatable element is provided with a first protrusion, and the distal end of the outer catheter assembly is provided with a second protrusion, and the first protrusion is rotatably engaged with the second protrusion.

* * * * *